Patented May 6, 1930

1,757,930

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ACCELERATOR OF VULCANIZATION

No Drawing.  Application filed December 10, 1927. Serial No. 239,266.

My invention relates to the treatment of rubber and it has particular relation to a method whereby the vulcanization of a rubber compound may be hastened or accelerated.

More specifically, my invention has for one of its objects the provision of a new class of vulcanization accelerators for rubber compounds.

Another object of the invention is to provide a compound of the above designated class which may be manufactured inexpensively and which may be readily incorporated into rubber upon the rolls of a mill without danger of scorching. When so employed the product produces rapid cures at relatively low temperatures.

Another object of the invention is to provide an accelerator of the rate of vulcanization of rubber compounds which is composed of the reaction product of a 2-halogen thiazole and its substitution products, and an organic sulphide.

It has been observed heretofore that certain thiazole compounds, for example mercaptobenzothiazole, whose structural formula may be represented as follows:

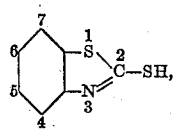

when incorporated into a vulcanizable rubber compound, greatly accelerates the rate of vulcanization of the latter. The product resulting from the practice of this process has a high degree of tensile strength and elasticity.

This invention consists in the discovery that certain thiazole compounds, for example 2-chlor benzothiazole having the structural formula:

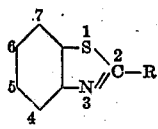

in which R represents a halide, may be caused to react with alkali salts of organic sulphides, for example, the sodium salt of diethyl dithiocarbamate, to produce a material having excellent properties as an accelerator when incorporated in rubber compounds.

The first mentioned material (2-chlor benzothiazole) may be conveniently prepared by the following method:

Dissolve 200 parts of crude mercaptobenzothiazole in 400 parts of pentachlorethane and then bubble chlorine gas through this solution for a period of several hours while the solution is being heated under a reflux condenser. Chlorination should continue preferably from five to seven hours, although this period may be shortened or increased somewhat at the will of the operator. However, the longer periods of chlorination result in a more complete reaction. The reaction product is then distilled and the fraction boiling at a temperature of 240° to 252° is separated from the remainder and represents the major portion of the reaction product of chlorine and mercapto-benzothiazole.

The 2-chlor benzothiazole prepared by the preceding method may be caused to react with various dithiocarbamates to produce excellent accelerators for rubber compounds.

The reaction product of 2-chlor benzothiazole and the sodium salt of diethyl dithiocarbamate is an example of a material of this class which has been found to be very efficient. The following method may be employed in the manufacture of this material.

Dissolve 133 grams of 2-chlor benzothiazole and 120 grams of sodium diethyl dithiocarbamate in 500 cc. of ethyl alcohol and reflux the solution for a period of six hours. The alcohol is then distilled off preferably under a reduced pressure and the reaction product remaining in the form of a residual oil is washed with water. The material may then be dried with anhydrous calcium chloride ($CaCl_2$) and filtered. The oil when distilled at a pressure of five mm. of mercury yields a light yellow oil which is a non-accelerator and a resinous residue which is an accelerator.

The invention is not limited to the reaction product of 2-chlor benzothiazole with the alkali salts of dithiocarbamates, but it also includes the substituted chlor-thiazoles; for example, 6-nitro 2-chlor benzothiazole may be caused to react with diethyl dithiocarbamate by the following method:

Dissolve 35 grams of 6-nitro 2-chlor benzothiazole in alcohol and heat the solution to boiling and then add 30 grams of sodium diethyl dithiocarbamate. After the solution has boiled for a period of five to ten minutes it solidifies as a yellow mass. The vessel containing the mass is exposed to the heat of a small flame for a period of an hour and is then cooled. The reaction product precipitates as a crystalline material which should be washed with water to remove any sodium chloride formed during the reaction. The crystalline material may be further purified by recrystallizing it from boiling alcohol from which it precipitates in form of yellow needles having a melting point of 120 to 122 degrees C.

The invention also includes the reaction products of halogenated thiazoles with various dithiocarbamates other than diethyl dithiocarbamate. Specific examples of these materials are the reaction products of chlor benzothiazoles with the salts of piperydyl dithiocarbamates (semi-solid oily substances), the reaction product of chlor benzothiazole with sodium dibenzyl dithiocarbamate (a dark oily material), the reaction product of sodium piperydyl dithiocarbamate with 2-chlor 6-nitrobenzothiazole (a crystalline substance having a melting point of 151–155° C.) and the reaction product of sodium dibenzyl dithiocarbamate with 2-chlor 6-nitrobenzothiazole (a light yellow solid having a melting point of 141–142° C.).

All of these materials may be prepared by methods similar to those employed in the preparation of the reaction product of 2-chlor benzothiazole and diethyl dithiocarbamate. The compounds so prepared may be employed as accelerators in most of the standard rubber compounds. The following is an example of a formula which insures excellent results when any of the substances above mentioned are employed as accelerators.

| | Parts |
|---|---|
| Extracted rubber | 100 |
| Zinc oxide | 5 |
| Sulphur | 3 |
| Stearic acid | 1.5 |
| Accelerator | .5 |

Samples of these materials were subjected to vulcanization by steam heat in a mold and the samples after vulcanization were subjected to physical tests to ascertain their yield and tensile strength. The results of these tests are contained in the following tables:

Reaction product 2-chlor benzothiazole sodium diethyl dithiocarbamate

| Cure | Load in kgs./cm.$^2$ at 700% elong. | Tensile strength kgs./cm.$^2$ | Per cent elong. |
|---|---|---|---|
| :20 at 20# | 95 | 180 | 810 |
| :45 at 20# | 164 | 230 | 760 |
| :30 at 40# | 85 | 165 | 800 |

Reaction product 2-chlor 6-nitrobenzothiazole and sodium diethyl dithiocarbamate

| Cure | Load in kgs./cm.$^2$ at 700% elong. | Tensile strength kgs./cm.$^2$ | Per cent elong. |
|---|---|---|---|
| :20 at 20# | 165 | 200 | 710 |

Reaction product of sodium piperydyl dithiocarbamate and 2-chlor benzothiazole

| Cure | Load in kgs./cm.$^2$ at | | Tensile strength kgs./cm.$^2$ | Per cent elong. |
|---|---|---|---|---|
| | 500% elong. | 700% elong. | | |
| :20 at 20# | 9 | 21 | 60 | 935 |
| :45 at 20# | 16 | 50 | 135 | 875 |
| 1:10 at 20# | 18 | 58 | 150 | 865 |
| :30 at 40# | 15 | 43 | 125 | 880 |

Reaction product sodium dibenzyl dithiocarbamate and 2-chlor benzothiazole

| Cure | Load in kgs./cm.$^2$ at | | Tensile strength kgs./cm.$^2$ | Per cent elong. |
|---|---|---|---|---|
| | 500% elong. | 700% elong. | | |
| :20 at 20# | 7 | 15 | 35 | 860 |
| :45 at 20# | 22 | 76 | 170 | 840 |
| 1:10 at 20# | 27 | 99 | 190 | 810 |
| :30 at 40# | 22 | 66 | 145 | 845 |

Reaction product sodium piperydyl dithiocarbamate and 2-chlor 6-nitro benzothiazole

| Cure | Load in kgs./cm.$^2$ at | | Tensile strength kgs./cm.$^2$ | Per cent elong. |
|---|---|---|---|---|
| | 500% elong. | 700% elong. | | |
| :20 at 20# | 40 | 200 | 205 | 705 |
| :45 at 20# | 47 | 186 | 190 | 705 |
| 1:10 at 20# | 43 | 173 | 205 | 730 |
| :30 at 40# | 33 | 116 | 180 | 770 |

Reaction product sodium dibenzyl dithiocarbamate and 2-chlor 6-nitro benzothiazole

| Cure | Load in kgs./cm.$^2$ at | | Tensile strength kgs./cm.$^2$ | Per cent elong. |
|---|---|---|---|---|
| | 300% elong. | 500% elong. | | |
| :20 at 20# | 50 | 200 | 235 | 730 |
| :45 at 20# | 46 | 178 | 235 | 750 |
| 1:10 at 20# | 40 | 159 | 205 | 745 |
| :30 at 40# | 27 | 88 | 180 | 815 |

It will be apparent from the preceding tables that the use of these accelerators results in rapid cures at comparatively low temperatures and the vulcanized product has excellent physical properties both with regard to tensile strength and elongation.

In the preceding examples specific reference has been made only to the reaction products of 2-chlor benzothiazoles with the sodium salts of the dithiocarbamates. However, the bromobenzothiazoles may be substituted for the chlor thiazoles and the potassium or other salts of the dithiocarbamates may be substituted in lieu of the sodium salt.

Although I have described in detail only the preferred embodiments of the invention, it will be apparent to those skilled in the art that it is not so limited but that various minor modifications may be made therein without departing from the spirit of the invention or from the scope of the appended claims.

What I claim is:

1. A method of treating rubber compounds which comprises vulcanizing the compounds in the presence of the reaction product of a 2-halogen benzothiazole and a dithiocarbamate.

2. A method of treating rubber compound which comprises vulcanizing the compounds in the presence of a material having the following structural formula

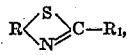

in which R represents an aryl group and $R_1$ represents a dithiocarbamate group, said material being an accelerator of the rate of vulcanization of the rubber.

3. A method of treating rubber compounds which comprises vulcanizing the compound in the presence of a material having the following structural formula

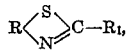

in which R represents an aryl group and $R_1$ represents a dithiocarbamate group.

4. A method of treating rubber compounds which comprises vulcanizing them in the presence of a material prepared in accordance with the following reaction:

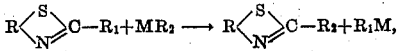

in which R represents an aryl group, $R_1$ represents a halogen group, M represents an alkali and $R_2$ represents a dithiocarbamate radical.

5. A method of treating rubber compounds which comprises vulcanizing them in the presence of the reaction product of a 2-chlor benzothiazole and the sodium salt of a diethyl dithiocarbamate.

6. A method of treating rubber compounds which comprises vulcanizing them in the presence of a material having the following structural formula:

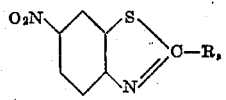

in which R represents a dithiocarbamate group.

7. A method of treating rubber compounds which comprises vulcanizing them in the presence of the reaction product of a nitro-2-chlor benzothiazole and an alkali salt of a dithiocarbamate.

8. A method of treating rubber compounds which comprises vulcanizing them in the presence of the reaction product of a nitro 2-halogen substituted benzothiazole and an alkali salt of diethyl dithiocarbamate.

9. A method of treating rubber compounds which comprises vulcanizing them in the presence of the reaction product of 6-nitro 2-chlor benzothiazole and the sodium salt of diethyl dithiocarbamate.

10. A rubber product that has been vulcanized in the presence of the reaction product of a 2-halogen substituted benzothiazole and an alkali salt of a dithiocarbamate.

11. A rubber product that has been vulcanized in the presence of a material having the following structural formula:

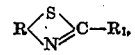

in which R represents an aryl group and $R_1$ represents a dithiocarbamate group.

12. A rubber product that has been vulcanized in the presence of a material that has been prepared in accordance with the following equation:

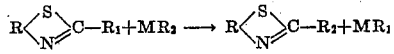

in which R represents a benzene group, $R_1$ represents a halogen group, M represents an alkali metal and $R_2$ represents a dithiocarbamate group.

13. A rubber product that has been vulcanized in the presence of a material formed by the interaction of a substance having the following structural formula

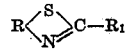

and a substance having the formula

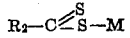

in which R represents a benzene group, $R_1$ represents a halogen group, $R_2$ represents an amino group, and M represents a metal.

14. A rubber product that has been vulcanized in the presence of the reaction product of a diethyl dithiocarbamate and a 2-halogen thiazole.

15. A method of treating rubber compounds which comprises subjecting them to vulcanization in the presence of a material having the following structural formula:

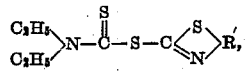

in which R represents an aryl group.

16. A rubber product which has been vulcanized in the presence of a material having the following structural formula:

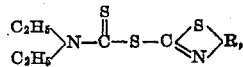

in which R represents an aryl group.

17. A method of treating rubber which comprises subjecting it to vulcanization in the presence of a material having the following structural formula:

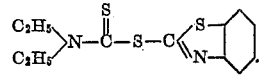

18. A method of treating rubber which comprises subjecting it to vulcanization in the presence of a material having the following structural formula:

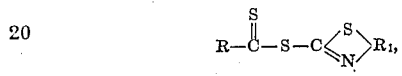

in which R represents an aliphatic amine group and $R_1$ represents an aryl group.

19. A method of treating rubber which comprises subjecting it to vulcanization in the presence of a material having the following structural formula:

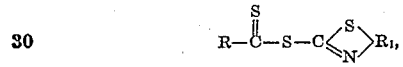

in which R represents an aliphatic amine group and $R_1$ represents a benzene nucleus.

20. A rubber product that has been vulcanized in the presence of a material having the following structural formula:

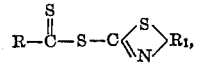

in which R represents an amine group and $R_1$ represents an aryl group.

21. A rubber product that has been vulcanized in the presence of a material having the following structural formula:

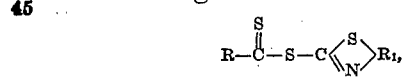

in which R represents an amine group and $R_1$ represents a benzene nucleus.

In witness whereof, I have hereunto signed my name at Akron, in the county of Summit, and State of Ohio, this 8th day of December, 1927.

JAN TEPPEMA.